US 7,920,577 B2

(12) United States Patent
Sadot

(10) Patent No.: US 7,920,577 B2
(45) Date of Patent: Apr. 5, 2011

(54) POWER SAVING IN WIRELESS PACKET BASED NETWORKS

(75) Inventor: Emek Sadot, Givatayim (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 1244 days.

(21) Appl. No.: 10/886,859

(22) Filed: Jul. 8, 2004

(65) Prior Publication Data
US 2006/0007924 A1   Jan. 12, 2006

(51) Int. Cl.
*H04L 12/56* (2006.01)
(52) U.S. Cl. .................................. 370/401; 370/428
(58) Field of Classification Search .................. 370/312, 370/401, 352, 235, 466, 395, 395.5, 428; 709/225, 227, 249, 250; 726/6
See application file for complete search history.

(56) References Cited

U.S. PATENT DOCUMENTS

| 5,570,366 | A | 10/1996 | Baker et al. | |
|---|---|---|---|---|
| 5,684,800 | A | 11/1997 | Dobbins et al. | |
| 5,920,699 | A | 7/1999 | Bare | |
| 6,493,767 | B1 | 12/2002 | Ishida et al. | |
| 6,553,421 | B1* | 4/2003 | Frick et al. | 709/227 |
| 6,556,575 | B1* | 4/2003 | Denio et al. | 370/401 |
| 6,587,127 | B1* | 7/2003 | Leeke et al. | 715/765 |
| 6,678,827 | B1* | 1/2004 | Rothermel et al. | 726/6 |
| 6,795,106 | B1* | 9/2004 | Cooper | 348/14.08 |
| 7,305,459 | B2* | 12/2007 | Klemba et al. | 709/220 |
| 2002/0083206 | A1* | 6/2002 | Volpano | 709/249 |
| 2003/0043781 | A1* | 3/2003 | Proctor et al. | 370/352 |
| 2003/0204560 | A1* | 10/2003 | Chen et al. | 709/203 |
| 2004/0162992 | A1* | 8/2004 | Sami et al. | 713/200 |
| 2004/0167988 | A1* | 8/2004 | Rune et al. | 709/238 |
| 2004/0187156 | A1* | 9/2004 | Palm et al. | 725/81 |
| 2004/0215687 | A1* | 10/2004 | Klemba et al. | 709/200 |
| 2004/0258012 | A1* | 12/2004 | Ishii | 370/328 |
| 2005/0018624 | A1* | 1/2005 | Meier et al. | 370/318 |
| 2005/0025129 | A1* | 2/2005 | Meier | 370/352 |
| 2005/0209927 | A1* | 9/2005 | Aaltonen et al. | 705/26 |
| 2005/0256926 | A1* | 11/2005 | Muhonen et al. | 709/205 |
| 2006/0080469 | A1* | 4/2006 | Coward et al. | 709/250 |

(Continued)

FOREIGN PATENT DOCUMENTS

CA    2491674 A1    1/2004

(Continued)

OTHER PUBLICATIONS

Telephony & Internet Telephony Networks; Standardization—2006—p. 1. EE526 Telephone & Internet Telephony Networks Fall 2006 Sung, Dan Keun Department of EECS, KAIST p. 2. 2 Communication Networks Research Lab. EE526.*

(Continued)

*Primary Examiner* — Salman Ahmed
(74) *Attorney, Agent, or Firm* — Joseph B. Ryan; Jason Paul DeMont; Wayne S. Breyer

(57) ABSTRACT

A method of handling broadcast packets, which are for a single network unit. The method includes receiving, by a network device, a packet, having a broadcast address, but directed to a single network unit and forwarding the packet through a plurality of ports of the network device, but not through at least one port of the device through which the packet was not received.

21 Claims, 2 Drawing Sheets

U.S. PATENT DOCUMENTS

| | | | |
|---|---|---|---|
| 2006/0182117 A1* | 8/2006 | Chen et al. | 370/395.5 |
| 2007/0208864 A1* | 9/2007 | Flynn et al. | 709/227 |
| 2007/0259700 A1* | 11/2007 | Meier et al. | 455/574 |
| 2007/0263538 A1* | 11/2007 | Hueck et al. | 370/232 |
| 2008/0030363 A1* | 2/2008 | Rezvani et al. | 340/825.22 |
| 2008/0159174 A1* | 7/2008 | Enomoto et al. | 370/256 |
| 2009/0147718 A1* | 6/2009 | Liu et al. | 370/312 |

FOREIGN PATENT DOCUMENTS

| | | |
|---|---|---|
| EP | 0 967 759 A2 | 12/1999 |
| EP | 05 25 4082 | 10/2005 |
| JP | 9-200262 A | 7/1997 |
| JP | 2001-292168 A | 10/2001 |
| JP | 2003-78545 A | 3/2003 |
| JP | 2003-224576 A | 8/2003 |

OTHER PUBLICATIONS

Interoperability of broadband access networks; from telenor.noS Paillard, T Montalant, A Gharagozlou—IST Project 2004.*

Edwards, Bob; "ProxyARP Subnetting HOWTO", Retrieved from Internet: <http://www.faqs.org/docs/Linux-mini/Proxy-ARP-Subnet.html> [available from Sep. 8, 2003]; pp. 1-6.

Weis, David; "Proxy ARP with Linux", Retrieved from Internet: <http://www.sjdjweis.com/linux/proxyarp/> [available from Sep. 8, 2003]; pp. 1-5.

R. Droms, "Dynamic Host Configuration Protocol," Network Working Group, Standards Track, pp. 1-46, Mar. 1997.

Lefebvre, Donald, "CA Application No. 2510053 Office Action May 11, 2009", , Publisher: CIPO, Published in: CA.

Wanzhi, Liu, "CN Application No. 200510083274 Office Action Feb. 6, 2009", , Publisher: SIPO, Published in: CN.

"EP Application No. 05254082.0 Office Action Mar. 20, 2008", , Publisher: EPO, Published in: EP.

Tabata, T., "JP Application No. 2005-199767 Office Action Jul. 13, 2009", , Publisher: JPO, Published in: JP.

Yagashira, N., "JP Application No. 2005-199767 Office Action Dec. 7, 2009", , Publisher: JPO, Published in: JP.

Lefebvre, Donald, "CA Application No. 2,150,053 Office Action Jul. 19, 2010", , Publisher: CIPO, Published in: CA.

* cited by examiner

POWER SAVING IN WIRELESS PACKET BASED NETWORKS

FIELD OF THE INVENTION

The present invention relates generally to wireless packet based networks.

BACKGROUND OF THE INVENTION

A major consideration in planning wireless units is reducing their power utilization so that they may be used for as long a period as possible after recharging. In wireless networks, when a wireless unit is not in use it moves into a sleep state having a low power consumption level. The wireless unit moves back to a normal state when it receives a transmission. In packet based networks, various network managing tasks are performed by transmitting control packets to all the nodes of the network. As wireless packet based networks are planned to be an integral part of a packet based network, the wireless units in the network also receive the control packets. The reception of the control packets by the wireless units, wakes the wireless units and uses their battery power.

For example, address resolution protocol (ARP) packets are transmitted by a sender unit to all the nodes of the network in order to determine the address of a destination to which the sender is interested in transmitting data.

The request for comments RFC 3220, the disclosure of which is incorporated herein by reference, describes an ARP proxy that services end units, intercepts ARP packets and responds to the ARP packets, if necessary, instead of the end units. Similar provisions are described in "ProxyARP Subnetting HOWTO", by Bob Edwards and in "Proxy ARP with Linux", by David Weis, the disclosures of which documents are incorporated herein by reference.

A dynamic host configuration protocol (DHCP) is used to configure IP units in a packet based network. Among other tasks, DHCP is used to automatically assign IP addresses to units. Generally, in a simplified manner, when a unit needs an IP address so that it can be contacted, the unit transmits a DHCP request with a broadcast address. An address server in charge of allocating the IP addresses generates a DHCP response packet with the requested IP address and transmits the response packet to the requesting unit, with a broadcast or unicast address. DHCP response packets with broadcast addresses are commonly used for the last step of the transmission, so that the response packets reach their destination even if the destination is not in the same local network (e.g., VLAN) as the sender, and a router along the path needs to provide the destination address of the requesting unit.

DHCP requests are for allocation of addresses, and for other tasks which should be performed by a single entity or by a plurality of coordinated entities. ARP requests are requests for address information which may be supplied by any unit knowing the information.

U.S. Pat. No. 5,920,699 to Bare, the disclosure of which is incorporated herein by reference, describes a switch that directs DHCP requests through a port leading to the address server according to the IP address of the address server in the DHCP request packet, if the IP address appears in the packet and the switch previously learned the port leading to the target location. According to the U.S. Pat. No. 5,920,699, if either the port leading to the address server is not known or the DHCP packet does not contain a specific server IP address, then the switch broadcasts the packet out all its ports.

For broadcast DHCP replies, the U.S. Pat. No. 5,920,699 suggests keeping track of the transaction ID in the DHCP requests handled by the switch and using the tracked IDs to direct broadcast DHCP replies back through the port leading to the requesting unit.

The method of the U.S. Pat. No. 5,920,699 is not sufficient in cases in which many wireless units are located behind a single port, as is commonly performed. In addition, the method of the U.S. Pat. No. 5,920,699 is relatively complex as it requires keeping the state of DHCP requests in order to correlate between the requests and replies.

SUMMARY OF THE INVENTION

An aspect of some embodiments of the invention relates to a network node (e.g., an access point or a switch) that identifies packets having a broadcast address, but directed to a single network unit, e.g., DHCP requests, and forwards the packets only through ports not leading to wireless units. Optionally, the wireless units and wire connected units of the network are connected to the network node through separate ports. In some embodiments of the invention, the network node has a plurality of ports leading to wire connected units and the network node forwards the DHCP requests through all the ports leading to wire connected units (except the port from which the request was received), without spending resources on determining which port leads to the address server.

An aspect of some embodiments of the invention relates to a network node (e.g., an access point or a switch) that identifies packets having a broadcast address, but directed to a single network unit, e.g., broadcast DHCP replies, and replaces their destination broadcast address by the address of the single network unit, e.g., the unit requesting an IP address in a respective DHCP request. The replacement of the destination address allows directing the packet to a single unit, even when the port leading to the unit leads to a plurality of other units.

In some embodiments of the invention, the address of the requesting unit is determined from an application layer field of the packet.

There is therefore provided in accordance with an exemplary embodiment of the invention, a method of handling broadcast packets, which are for a single network unit, comprising receiving, by a network device, a packet, having a broadcast address, but directed to a single network unit, and forwarding the packet through a plurality of ports of the network device, but not through at least one port of the device through which the packet was not received.

Optionally, receiving the packet comprises receiving an address allocation request or response, for example a DHCP request or response packet. Optionally, receiving the packet comprises receiving a DHCP response packet directed to a wireless unit. Alternatively, receiving the packet comprises receiving a DHCP response packet directed to a wire-connected unit. Optionally, forwarding the packet comprises forwarding through ports not leading to wireless units. Optionally, forwarding the packet comprises forwarding through a list of ports configured in the network device.

There is further provided in accordance with an exemplary embodiment of the invention, a method of handling broadcast packets, which are for a single network unit, comprising receiving, by a network device, a packet, having a broadcast address, but directed to a single network unit, replacing the broadcast address of the packet with a unicast address of the network unit for which the packet is intended and forwarding the packet as a unicast packet.

Optionally, receiving the packet comprises receiving a DHCP packet, such as a DHCP response packet or a DHCP request packet. Optionally, replacing the broadcast address comprises replacing to a unicast address extracted from an application field of the packet.

There is further provided in accordance with an exemplary embodiment of the invention, a network device, comprising a plurality of physical ports, an input interface for receiving packets through the ports, a determination module, adapted to identify in the packets received by the input interface packets that have a broadcast address, but are directed to a single network unit; and a forwarding unit adapted to forward packets identified by the determination module through a plurality of the physical ports, but not through at least one port of the device through which the packet was not received.

Optionally, the determination module is adapted to identify DHCP packets. Optionally, the device includes a configuration module adapted to configure the forwarding unit with a list of ports through which identified packets are to be forwarded. Optionally, the configuration module is adapted to exchange control packets with neighboring network devices to determine the ports through which identified packets are to be forwarded. Optionally, the device includes a user interface for receiving indications of the ports through which identified packets are to be forwarded from a human operator.

There is further provided in accordance with an exemplary embodiment of the invention, a network device, comprising a plurality of physical ports, an input interface for receiving packets through the ports, a determination module, adapted to identify in the packets received by the input interface packets that have a broadcast address, but are directed to a single network unit, and a replacing module adapted to replace the broadcast address of the packet with a unicast address of the network unit for which the packet is intended.

Optionally, the replacing module is adapted to determine the unicast address from an application field of the packet.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
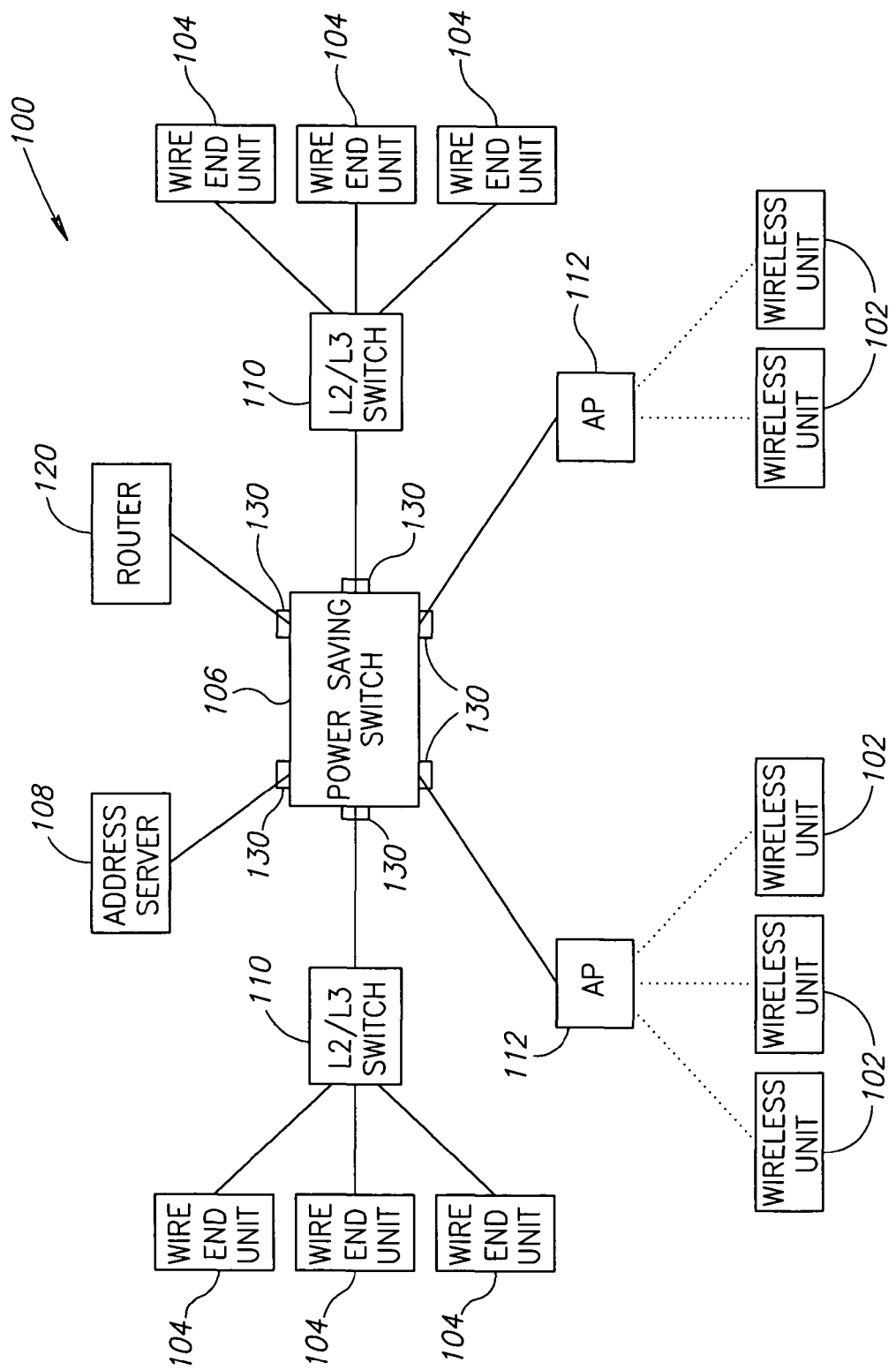
FIG. 1 is a schematic illustration of a local area network including wireless units, in accordance with an exemplary embodiment of the invention.

FIG. 1 is a schematic illustration of a local area network 100, used to explain an exemplary embodiment of the invention. Network 100 includes a plurality of wire-connected end units 104, such as computers, printers, telephones and/or faxes. Wire connected end-units 104 are connected to switches 110 which in turn are connected to a central switch, referred to herein as power saving switch 106. In addition, power saving switch 106 is connected to one or more access points (AP) 112 that service wireless units 102. FIG. 1 further shows an address server 108 (e.g., a DHCP server), which allocates IP addresses to wireless units 102 and/or to wire-connected end units 104. A router 120 optionally connects local area network 100 to other networks, for example to the Internet. It is noted that network 100 is shown by way of example and the invention may be implemented in substantially any packet based network, regardless of the network layout.

In some embodiments of the invention, as is now described, power saving switch 106 is configured to perform acts that reduce the number of unnecessary broadcast packets received by wireless units 102. Thus, switch 106 reduces the power consumption of wireless units 102. It is noted that power saving switch 106 is not directed at reducing the power consumption of the switch itself. In fact, power saving switch 106 may have a higher power consumption than prior art switches, due to the tasks it performs in accordance with the present invention. Typically, power saving switch 106 has a plurality of ports (schematically indicated by 130), different ports 130 optionally being used for wireless units 102 and for wire-connected units. That is, local switches 110 optionally handle only wire end units 104 and/or APs 112 handle only wireless units 102. Power saving switch 106 is optionally configured, or automatically determines, with information on which of its ports lead to wireless units 102. In some embodiments of the invention, the information on the ports leading to wireless units 102 is configured by a human system operator. Alternatively or additionally, the information on the ports is discovered automatically, for example, based on a protocol which involves exchanging control packets between neighboring and/or non-neighboring network elements.

As is known in the art, when a wireless unit 102 or a wire end unit 104 needs to request an IP address for itself, the unit transmits a DHCP request packet as a broadcast message to all the nodes of network 100. The DHCP request is generally transmitted as a broadcast message since the end units 102 and 104 are not always configured with the IP address of the address server 108 they are to approach and may not have an IP address at the time of transmission. In some embodiments of the invention, APs 112 are configured to forward packets received from a wireless unit 102 only to wire connected nodes (in the layout of FIG. 1, only to power saving switch 106). As described below, power saving switch 106 forwards the DHCP request to address server 108, and optionally other wire-connected units, without forwarding the request to any of wireless units 102 (i.e., to any APs 112).

In some cases, the DHCP response is generated by address server 108 with a broadcast address, as the requesting unit 102 or 104 may not be in the same local area network as the address server. As described below, power saving switch 106 optionally replaces the broadcast address with a unicast address of the unit 102 or 104 that transmitted the DHCP request, so that the response only reaches that unit 102 or 104.

Figure 2:
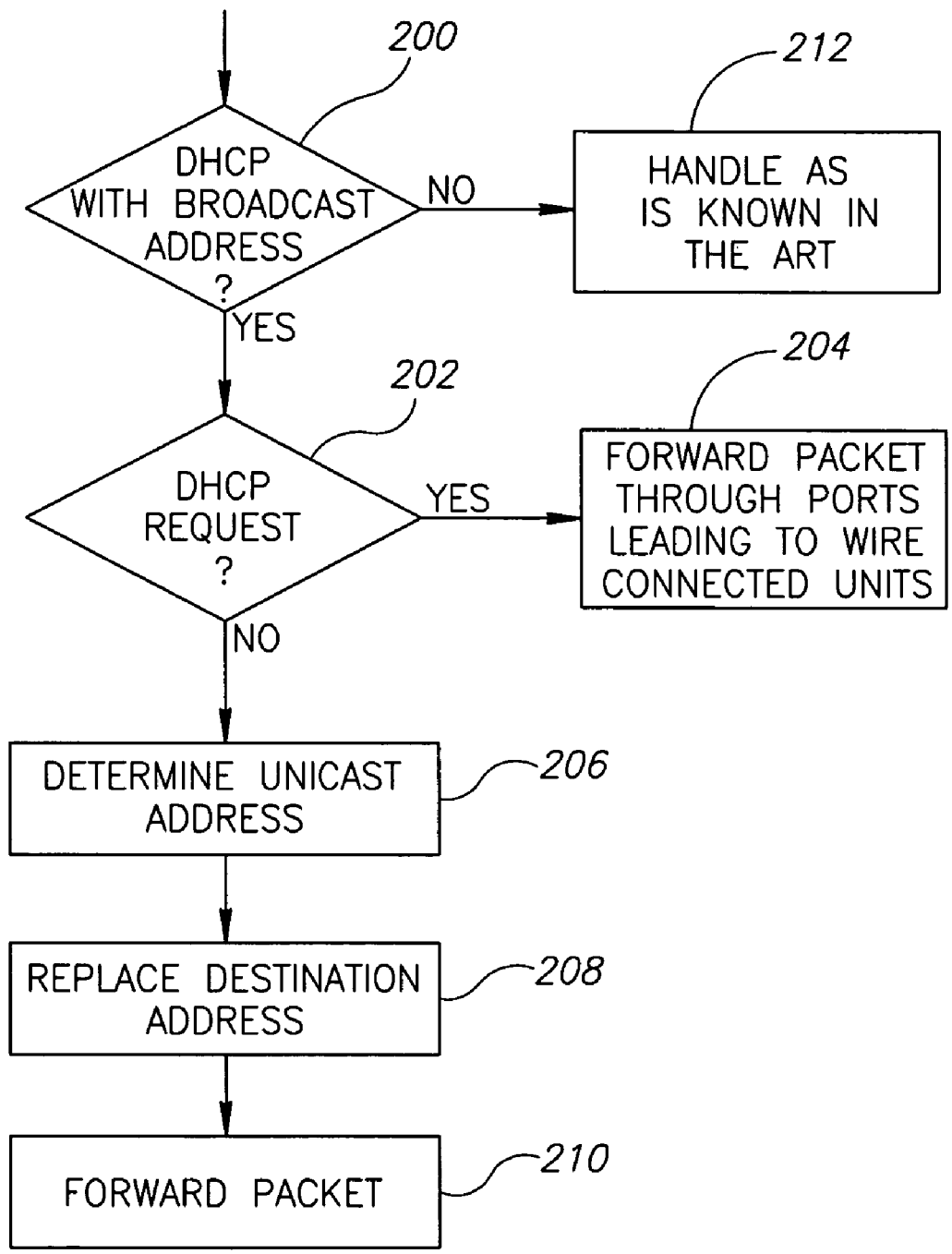
FIG. 2 is a flowchart of acts performed by a power saving switch, in accordance with an exemplary embodiment of the invention.

FIG. 2 is a flowchart of acts performed by power saving switch 106, in accordance with an exemplary embodiment of the invention. For each packet received, switch 106 determines (200) whether the packet is a DHCP packet and has a broadcast address. If the packet is not a broadcast packet and/or is not a DHCP packet, the packet is handled (212) using any procedure known in the art. If (200) the packet is a DHCP packet having a broadcast address, power saving switch 106 determines (202) whether the packet is a DHCP request or a DHCP response. If (202) the DHCP packet is a request packet, the packet is forwarded (204) through the ports of switch 106 that lead to wire connected units (optionally except the port through which the request was received). If (202) the DHCP packet is a response packet, power saving switch 106 determines (206) the unicast address of the unit to which the response is directed and replaces (208) the destination address of the packet with the determined unicast address. The packet is then forwarded (210) by power saving switch 106 as a regular unicast packet.

The determination of whether the packet is a DHCP packet is optionally performed by examining the protocol field of the packet. In some embodiments of the invention, the determination of whether the packet is a DHCP packet is performed after the determination of whether the packet is a broadcast packet. Alternatively the determination is performed concurrently or it is first determined whether the packet is a DHCP packet.

In some embodiments of the invention, power saving switch 106 comprises a hardware unit that performs regular tasks and a software unit that handles special packets that cannot be handled automatically by the hardware unit. Optionally, the hardware unit identifies DHCP broadcast packets and transfers them to the software unit for handling. Alternatively, DHCP requests are handled by the hardware unit while the DHCP responses are handled by the software unit.

As is known in the art, DHCP packets have a field which indicates whether the packet is a request or response. This field is optionally used in determining (202) whether the packet is a request or a response.

Referring in more detail to forwarding (204) DHCP requests through the ports of switch 106 that lead to wire connected units, in some embodiments of the invention as described above, wireless and wire-connected units are connected to different ports of switch 106, and DHCP requests are forwarded only through ports leading to wire connected units. Alternatively or additionally, when possible, switch 106 is configured with the port leading to address server 108 and DHCP requests are forwarded only through this port. Further alternatively or additionally, wire-connected units and wireless units may be connected through a single port of switch 106, provided that address server 108 is not connected along with wireless units. In accordance with this alternative, switch 106 is configured to forward DHCP requests through ports that are not connected to any wireless units or only through the port connected to address server 108. Further alternatively or additionally, switch 106 is configured with (or automatically determines) the IP address of address server 108 and switch 106 replaces the destination address of DHCP requests with the address of address server 108.

Referring in more detail to determining (206) the unicast address of the unit to which the response is directed, in some embodiments of the invention, switch 106 examines an application layer field of the packet in which the address is stated, for example a client identifier field (e.g., stating a MAC address of the client). Alternatively or additionally, whenever a DHCP request is received, switch 106 registers, in a table entry, an ID of the request appearing in the packet along with a source address of the packet. When a DHCP response is received, switch 106 matches the response to a table entry and accordingly determines the unicast destination address of the packet.

Alternatively to handling all broadcast DHCP packets in the same way, DHCP responses directed to wireless units are handled differently from DHCP responses directed to wire-connected units. In some embodiments of the invention, the destination address of DHCP responses directed to wire-connected units are not replaced, but rather these DHCP responses are forwarded as DHCP requests, only through ports that lead to wire-connected units (there is generally no need to reduce the power consumption of wire connected units).

Although in the above description, the invention is described as being performed by a central switch 106 through which substantially all the traffic of network 100 passes, this is not necessary. In some embodiments of the invention, power-saving switch 106 covers only a portion of network 100 that leads to wireless units 102. Other units, e.g., wire end units 104, may optionally communicate with address server 108 and/or other network elements, without their traffic passing through power-saving switch 106.

Furthermore, the tasks described above as being performed by central switch 106 may optionally be performed by other network elements, such as by one or more of APs 112. Alternatively to performing all the handling tasks of the present invention by a single unit, in some embodiments of the invention, the special handling rules of the present invention are applied to different DHCP packets by different units. For example, DHCP request packets are optionally handled by APs 112, by preventing their transmission to wireless units, while DHCP responses are handled by switch 106 as described above. In some embodiments of the invention, a plurality of units throughout the network perform the same above described tasks, thus distributing the load between the units. Optionally, the address replacements are performed by a network unit located within a same local area network as the destination of the packet.

It will be appreciated that the above described methods and apparatus may be varied in many ways, including, changing the order of acts of the methods, and the exact implementation used for the apparatus. It should also be appreciated that the above described methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. For example, the method of the present invention is not limited to the DHCP protocol and may be used with similar protocols, such as the BOOTP protocol. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method comprising:
  receiving, by a first data-processing system, a first packet transmitted by a first terminal, wherein the first packet is to be transmitted by the first data-processing system to wireless terminals and wireline terminals based on a broadcast address of the first packet;
  storing, by the first data-processing system after receiving the first packet, an identifier of the first packet along with a source address of the first packet;
  identifying, by the first data-processing system:
    (i) a first plurality of ports of the first data-processing system that only lead to wireline terminals, and (ii) a second plurality of ports of the first data-processing system that only lead to wireless terminals;

transmitting, by the first data-processing system, the first packet to a second data-processing system, wherein the first packet is only transmitted through the first plurality of ports as a result of identifying that the first plurality of ports only lead to wireline terminals;

receiving, by the first data-processing system, a response to the first packet, wherein the response is transmitted by the second data-processing system; and transmitting, by the first data-processing system, the response as a unicast packet to the first terminal, wherein the response is transmitted as a unicast packet based on the identifier of the first packet.

2. The method of claim 1 wherein the first packet is:
(i) a Dynamic Host Configuration Protocol packet, and
(ii) a request for an Internet Protocol address.

3. The method of claim 1 wherein the first packet is:
(i) a Bootstrap Protocol packet, and
(ii) a request for an Internet Protocol address.

4. The method of claim 1 wherein the second plurality of ports connect the first data-processing system to an access point that only leads to wireless terminals.

5. The method of claim 4 wherein the access point is configured to transmit a second packet received from a first wireless terminal to only wireline terminals, and wherein the second packet is a request for an Internet Protocol address.

6. The method of claim 1
wherein the first data-processing system identifies the first plurality of ports and the second plurality of ports based on exchanging control packets between:
(i) the first data-processing system and the wireline terminals, and
(ii) the first data-processing system and the wireless terminals.

7. The method of claim 1 wherein the first data-processing system transmits the first packet to the second data-processing system via the first plurality of ports when, and only when, the first data-processing system identifies that:
(i) the first packet is a Dynamic Host Configuration Protocol request packet, and
(ii) the first packet comprises a broadcast address.

8. The method of claim 1 wherein the first data-processing system transmits the response as a unicast packet to the first terminal when, and only when, the first data-processing system identifies that:
(i) the response is a Dynamic Host Configuration Protocol response packet, and
(ii) the response comprises a broadcast address.

9. The method of claim 1 wherein the task of transmitting the response further comprises:
identifying, by the first data-processing system, whether the response matches the identifier of the first packet, wherein the identifier is established by the first data-processing system in response to receiving the first packet from the first terminal; and
replacing, by the first data-processing system, a broadcast address of the response with the source address of the first packet when the response matches the identifier.

10. The method of claim 1 wherein the response received from the second data-processing is intended to be broadcasted to:
(i) the first plurality of ports of the first data-processing system that only lead to wireline terminals, and
(ii) a second plurality of ports of the first data-processing system that only lead to wireless terminals.

11. The method of claim 1 wherein the source address of the first packet is a Media Access Control address of the first terminal.

12. The method of claim 1 wherein the source address is extracted from an application layer field of the first packet by the first data-processing system.

13. A method comprising:
transmitting, by a first data-processing system, a first packet to:
(i) a plurality of wireline terminals, and
(ii) a plurality of wireless terminals;
receiving, by the first data-processing system, a first response to the first packet from:
(i) the plurality of wireline terminals, and
(ii) the plurality of wireless terminals;
identifying, by the first data-processing system, based on the first response:
(i) a first plurality of ports of the first data-processing system that only lead to the plurality of wireline terminals, and
(ii) a second plurality of ports of the first data-processing system that only lead to the plurality of wireless terminals;
receiving, by the first data-processing system, a second packet transmitted by a first terminal, wherein the second packet is to be broadcasted to the plurality of wireline terminals and the plurality of wireless terminals based on a broadcast address of the second packet; and
selectively transmitting, by the first data-processing system, the second packet to a second data-processing system wherein the second packet is selectively transmitted to the first plurality of ports as a result of identifying that the first plurality of ports only lead to the plurality of wireline terminals.

14. The method of claim 13 wherein the second packet is:
(i) a Dynamic Host Configuration Protocol (DHCP) packet, and
(ii) a request to retrieve an Internet Protocol address.

15. The method of claim 13 wherein the second packet is:
(i) a Bootstrap Protocol (BOOTP) packet, and
(ii) a request to retrieve an Internet Protocol address.

16. The method of claim 13 wherein the second plurality of ports of the first data-processing system connect the first data-processing system to an access point, and wherein the access point is only connected to wireless terminals.

17. The method of claim 16 wherein the access point is configured to transmit a third packet received from a first wireless terminal to only wireline terminals, and wherein the third packet is a request for address allocation.

18. The method of claim 13 wherein the second packet is intended to be broadcasted to the plurality of wireline terminals and the plurality of wireless terminals based on a broadcast address specified in the second packet.

19. The method of claim 13 further comprising:
receiving, by the first data-processing system, a second response to the second packet, wherein the second response is transmitted by the second data-processing system; and
transmitting, by the first data-processing system, the second response to the first terminal as a unicast packet.

20. The method of claim 19 wherein the task of transmitting the second response as a unicast packet to the first terminal further comprises:
identifying, by the first data-processing system, whether the second response matches an identifier of the second packet, wherein the identifier is established by the first data-processing system in response to receiving the second packet from the first terminal; and replacing, by the first data-processing system, a broadcast address of the second response with a source address of the second packet when the second response matches the identifier.

21. The method of claim 20 wherein the source address of the second packet is a Media Access Control (MAC) address of the first terminal.

* * * * *